United States Patent [19]
Dunham

[11] 3,762,166
[45] Oct. 2, 1973

[54] HYDRAULIC DRIVE SYSTEM
[76] Inventor: James A. Dunham, Diamond Bar, Calif.
[22] Filed: Aug. 20, 1971
[21] Appl. No.: 173,359

[52] U.S. Cl. ................................. 60/493
[51] Int. Cl. ........................... F16h 39/02
[58] Field of Search ............... 60/53 R, 52 B, 19, 60/489, 493, 459, 460, 466

[56] References Cited
UNITED STATES PATENTS

| | | | |
|---|---|---|---|
| 1,838,733 | 12/1931 | Beattie | 60/493 |
| 2,654,998 | 10/1953 | Naylor et al. | 60/460 |
| 3,258,022 | 6/1966 | Thompson | 60/493 |
| 3,125,324 | 3/1964 | Vivier | 60/53 R X |
| 3,153,900 | 10/1964 | Pigeroulet et al. | 60/53 R X |
| 3,175,354 | 3/1965 | Firth et al. | 60/19 |
| 3,402,549 | 9/1968 | Connett et al. | 60/19 |
| 3,667,226 | 6/1972 | Asmus et al. | 60/53 R |
| 3,672,168 | 6/1972 | Salmon | 60/53 R |

Primary Examiner—Edgar W. Geoghegan
Attorney—Boniard I. Brown

[57] ABSTRACT

A hydraulic drive system for automotive vehicles and other applications. The drive system has a hydraulic pump operable through a range of speeds between selected idling and high speeds, a rotary hydraulic motor, and a manual shift control valve for selectively communicating the pump and motor parts to place the drive system in various operating modes, such as drive, low, neutral and reverse. Novel features of the drive system reside in its unique hydraulic circuitry, in the arrangement and construction of its shift control valve, in an idling valve which permits the pump to run at idling speed without driving the motor, and in a hydraulic braking arrangement for producing a hydraulic braking action on the motor both manually and when coasting.

10 Claims, 3 Drawing Figures

INVENTOR
JAMES A. DUNHAM
BY
ATTORNEY

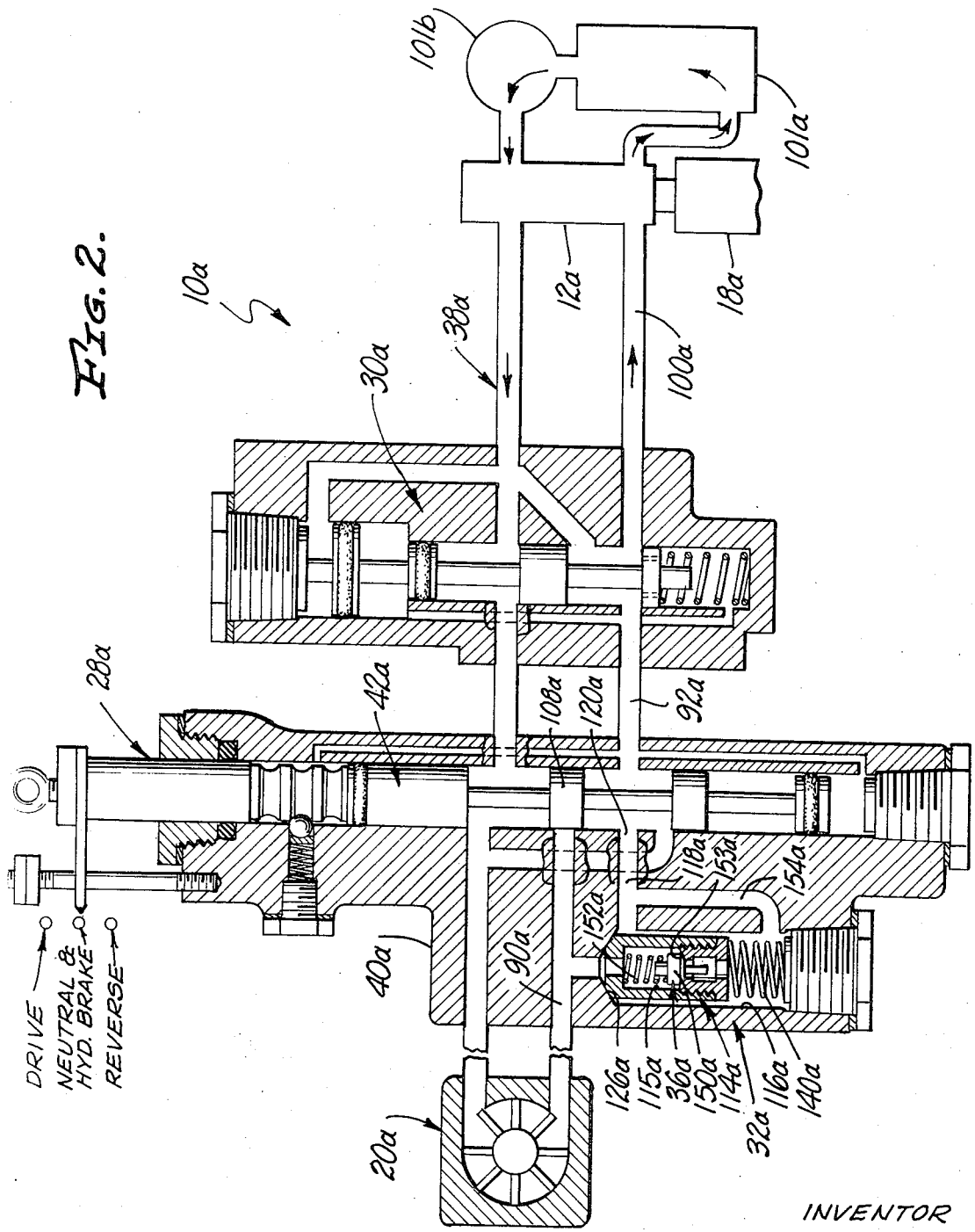

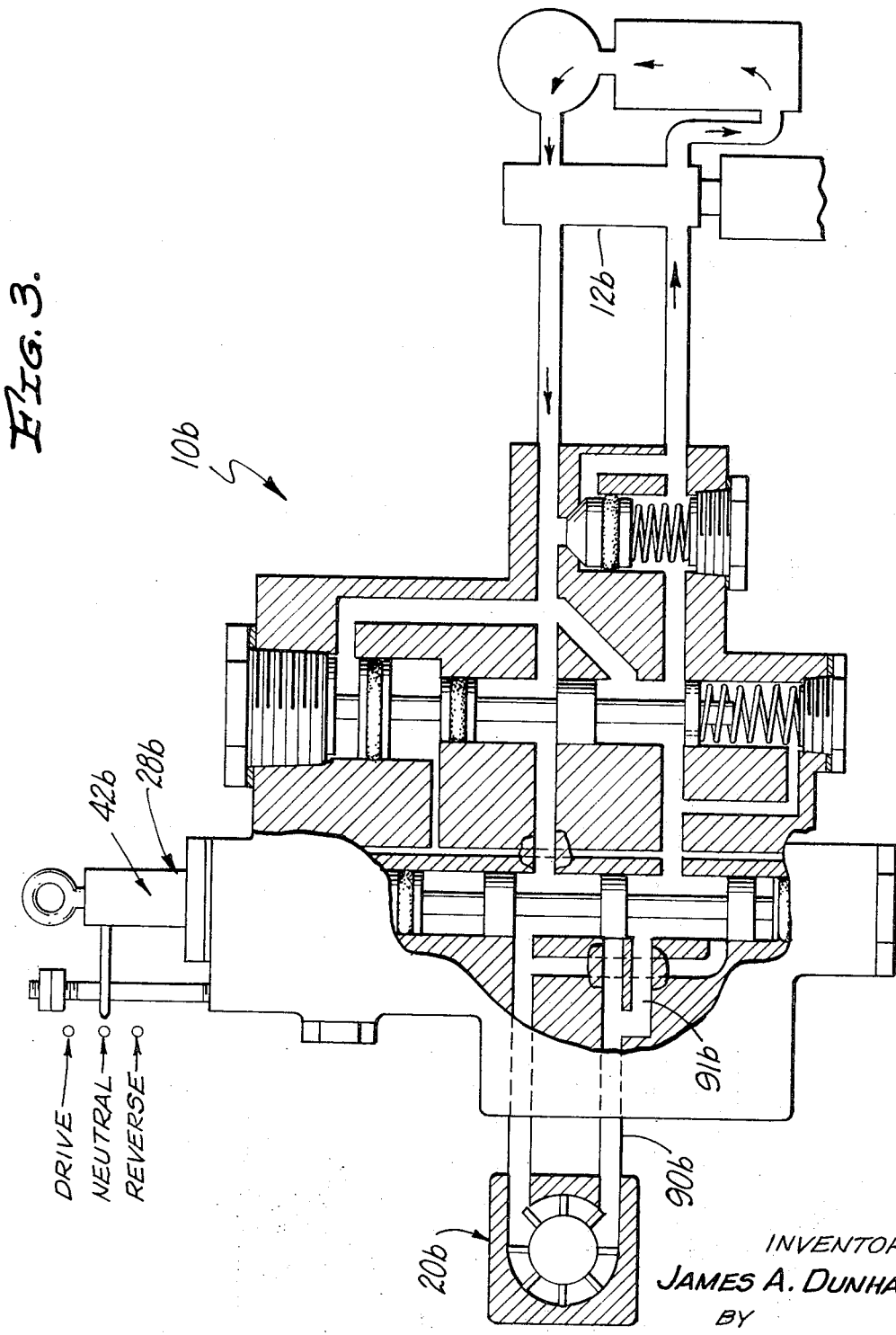

HYDRAULIC DRIVE SYSTEM

BACKGROUND OF THE INVENTION

1. Field of the Invention

This invention relates generally to hydraulic systems and more particularly to a novel hydraulic drive system for automotive vehicles and other applications.

2. Discussion of the Prior Art

As will appear from the ensuing description, the hydraulic drive system of the invention may be utilized for a wide variety of applications. A primary application of the drive system is propelling an automotive vehicle. The invention will be disclosed in connection with this particular application.

The prior art is replete with a vast assortment of hydraulic drive systems for automotive vehicles. By way of example, the following is a list of a few of the prior art patents relating to such drive systems: U.S. Pat. Nos. 1,008,202; 1,977,033; 2,650,573; 2,917,897; 3,351,147; 3,354,977 and 3,430,722.

While such hydraulic automotive drive systems vary greatly in their detailed arrangements, most if not all of the drive systems are characterized by certain common components including a hydraulic pump driven by an internal combustion engine, one or more hydraulic motors coupled to the vehicle drive wheels, and a manual shift control valve for selectively communicating the pump and motor parts to place the drive system in various operating modes, such as forward, neutral, and reverse. In operation of such a drive system, the pump is driven by its engine to deliver hydraulic fluid under pressure through the control valve to the hydraulic motor or motors for driving the latter and thereby the vehicle wheels. Low pressure exhaust fluid from the motor returns to the pump through the control valve. The control valve is adjustable to effect hydraulic fluid flow in either direction through the motor to drive the latter in either direction for propelling the vehicle forwardly and in reverse, and to cut off fluid flow through the motor to cease propulsion of the vehicle.

SUMMARY OF THE INVENTION

The present invention provides an improved hydraulic drive system of the class described wherein the hydraulic pump is operable by its driver or engine through a range of operating speeds between selected idling and high speeds to control or regulate the hydraulic motor speed. One unique feature of the invention resides in an idling valve for controlling hydraulic fluid flow through an idling passage which communicates the pump inlet and outlet parts in hydraulic parallel relation with the hydraulic motor. This idling valve is biased to open position, wherein the valve permits fluid flow through the idling passage from the motor outlet to the motor inlet, against the pump outlet pressure. When the valve is open, fluid flow through the motor is cut off to permit operation of the pump without driving the motor. Closure of the valve effects fluid flow through the motor to drive the latter.

The opening force on the idling valve is set to retain the valve open when the pump is operating at idling speed so that the pump may idle without driving the motor. When the pump speed is increased, the increasing pump outlet pressure closes the valve to effect driving of the motor at an increasing speed. Closing movement of the valve is retarded by viscous damping means to achieve smooth acceleration of the motor. The idling valve is arranged for operation in both the forward and reverse directions of motor rotation.

Arranged in hydraulic parallel relation with the idling valve is a pressure relief valve which opens in response to a preset pump outlet pressure to prevent excessive pump pressure when the idling valve is closed.

Another feature of the invention involves a hydraulic braking action for the drive system motor. This braking action is achieved by providing the hydraulic circuit of the drive system with a by-pass passage arranged in hydraulic parallel relation with the flow passage through which hydraulic fluid returns from the motor, through the shift control valve, to the pump in one direction of motor rotation. Within this by-pass is a braking valve for controlling fluid flow through the by-pass. The control valve is movable to a hydraulic braking position wherein the motor return passage is blocked, such that the entire return flow from the motor to the pump occurs through the by-pass. Some flow also occurs through the by-pass when the control valve is in a forward drive position. The braking valve is operable to restrict the fluid flow through the by-pass and thereby produce on the motor a hydraulic braking action which is greatest when the control valve is braking position.

In one disclosed embodiment, the braking valve is hydraulically operated by a foot pedal or the like in such a way that depression of the pedal closes the valve to produce the hydraulic braking action. A pressure relief valve is arranged in hydraulic parallel with the braking valve to prevent excessive hydraulic braking force on the motor. In another disclosed embodiment, the braking valve is spring biased to closed position against the motor outlet pressure. The braking action is applied and regulated by moving the shift control valve to and from hydraulic braking position to divert some or all of the return fluid flow from the motor to the pump through the braking valve which opens under the increasing return flow pressure to permit the return flow while producing the hydraulic braking action on the motor.

Other features of the invention reside in the construction and and arrangement of the shift control drive system.

BRIEF DESCRIPTION OF THE DRAWINGS

FIG. 2 illustrates a modified drive system with a hydraulic braking action for merely aiding the standard vehicle brake system; and FIG. 3 illustrates a further modified drive system embodying no hydraulic braking action.

DESCRIPTION OF THE PREFERRED EMBODIMENT

Figure 1:
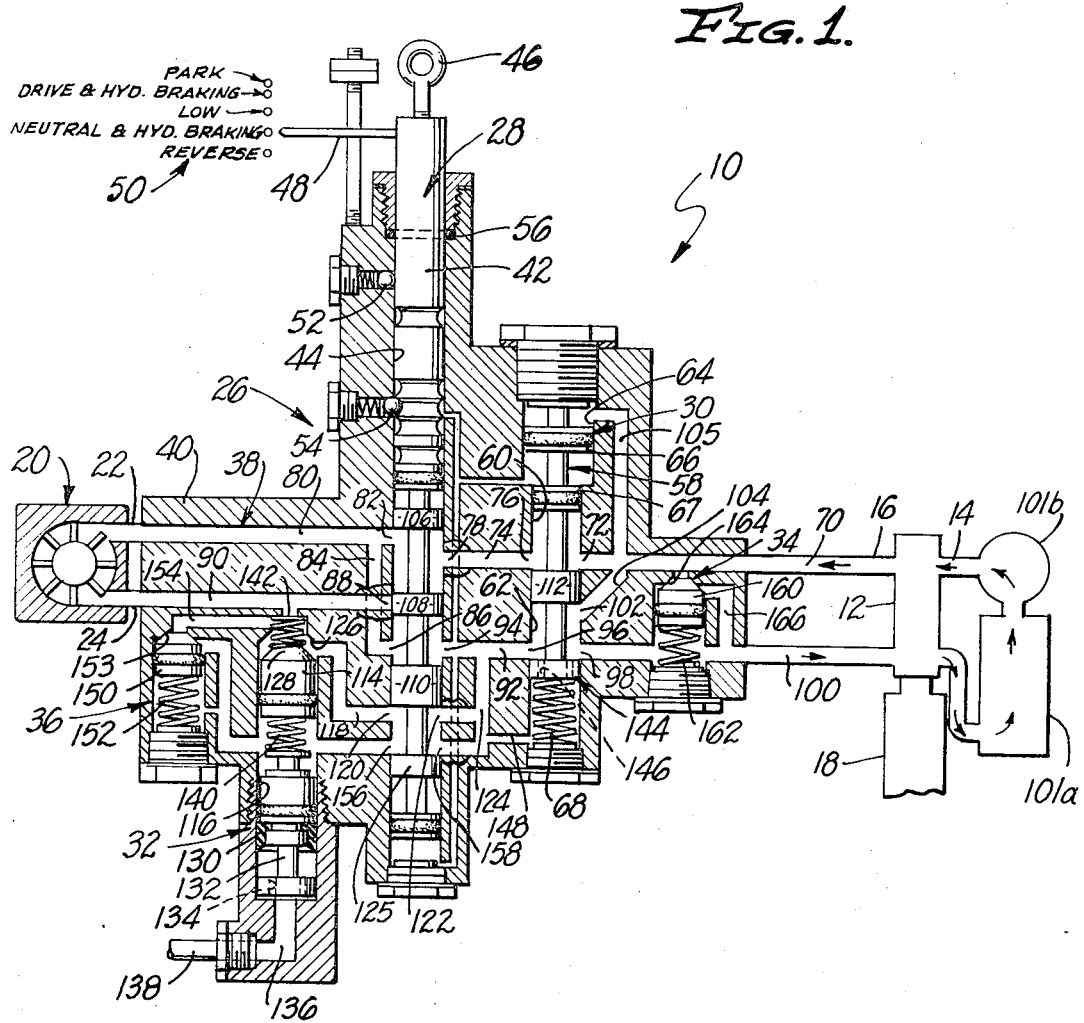
FIG. 1 illustrates a hydraulic drive system according to the invention embodying a hydraulic braking action designed to aid or replace the standard brake system of a vehicle.

Referring first to FIG. 1, the illustrated hydraulic drive system 10 comprises a hydraulic pump 12, having fluid inlet and outlet ports 14 and 16, a prime mover 18 for driving the pump, a rotary hydraulic motor 20 having fluid ports 22 and 24, and means 26 for conducting hydraulic fluid between the pump and motor to effect driving of the motor in either direction by the pump. The particular drive system shown is intended primarily for use as a propulsion system for automotive vehicles. In this use, the prime mover 18 is an internal combustion engine whose speed is controlled by the driver in the usual way. The motor 20 is coupled to the vehicle drive wheels. As noted earlier, however, the drive system is not limited to this use.

Fluid conducting means 26 comprises a shift control valve 28, an idling valve 30, a hydraulic braking valve 32, pressure relief or over-pressure valves 34 and 36, and passage means 38 communicating the several valves and the pump 12 and motor 20 in the manner explained below. In the particular hydraulic drive system shown, the several valves and communicating fluid passages are contained within a unitary block 40 which may be cast and machined or otherwise fabricated. If desired, however, the several valves may be individual components connected by fluid conduits.

Shift control valve 28 has a valve spool 42 movable longitudinally within a bore 44 in the valve block 40. The upper end of the valve spool extends externally of the block and is provided with means 46 for connection through linkage to a shift lever (not shown). Valve spool 42 is movable to a number of operating positions, namely, park, forward drive, low, neutral, and reverse. In the drawings these positions are indicated by a pointer 48 on the upper end of the valve spool and printed legends 50 adjacent the pointer. However, in an actual hydraulic drive system, the pointer will be mounted on the shift lever which, in an automotive vehicle, will be mounted on the steering column or in some other location convenient to the driver as is the shift lever of a conventional automotive vehicle. Detents 52 and 54 are provided to yieldably retain the valve spool 42 in its various positions. An O-ring 56 seals the upper end of the valve spool to the valve block 40. The shift control valve 28 will be described in more detail presently.

Turning now for the moment to the idling valve 30, the latter comprises a valve spool 58 movable longitudinally in a bore 60 in the valve block 40, parallel to shift control valve bore 44. Valve bore 60 has a relatively small diameter lower end 62 which provides the valve bore proper and a relatively large diameter upper end 64 which provides a cylinder. Fixed on the upper end of the idling valve spool 58 is a piston 66 slidable in and sealed to the wall of the cylinder 64. A second piston 67 on the valve spool slides in and is sealed to the wall of the valve bore 62, just below the cylinder. As will appear presently, the outlet pressure of the pump 12 acts on the upper face of the piston 66 to urge the valve spool 58 downwardly to a lower closed position. A compression spring 68 at the lower end of the valve spool urges the latter upwardly to an upper open position. The idling valve 30 like the shift control valve 28 will be referred to again presently.

Fluid passage means 38 include a fluid passage 70 extending between the pump outlet 16 and a port 72 of the idling valve 30, a passage 74 extending between an idling valve port 76 and a port 78 of the shift control valve 28 and a passage 80 extending from a control valve port 82 to the motor port 22. Passage 80 connects via a by-pass passage 84 to a port 86 of the shift control valve. Extending between the motor port 24 and a port 88 of the control valve is a passage 90. A passage 92 extends between a control valve port 94 and an idling valve port 96. A port 98 of the idling valve 30 connects to the pump inlet 14 via a passage 100, a heat exchanger 101a and a hydraulic fluid reservoir 101b. An idling port 102 of the idling valve connects to the pump passage 70 through an idling passage 104. A passage 105 connects the passage 70 to the upper end of the idling valve cylinder 64.

Returning now to the shift control valve 28 and idling valve 30, the control valve spool 42 has spaced lands 106, 108 and 110 for controlling flow through the valve ports 78, 82, 86, 88 and 94. The idling valve spool 58 has a single land 112 for controlling fluid flow through the idling port 102. Thus, land 112 uncovers and thereby opens the idling port in the upper open position of the valve spool 58. In the lower closed position of the spool, the land covers and closes the port. The remaining idling valve ports 72, 76, 96, 98 remain open at all times.

Turning now to the hydraulic braking valve 32, the latter comprises a piston 114 movable in a cylinder bore 116 in the valve block 40. The upper end of this cylinder communicates with motor passage 90 and with a by-pass passage 118 leading to a port 120 of the shift control valve 28. An opposing port 122 of the control valve communicates through a passage 124 to the passage 92. The shift control valve spool 42 has a lower land 125 for controlling fluid flow through ports 120, 122. About the upper end of the braking valve cylinder 116, between the passage 90 and passage 118 is a valve seat 126 engageable by a valve face 128 on the upper end of the valve piston 114 to block fluid flow from passage 90 to passage 118. Movable in the valve cylinder 116 below the valve piston is a plunger 130 having a lower stem 132 which has an enlarged guide portion having small fluid openings 134. This opening communicates through a lower cylinder passage 136 and a conduit 138 to a hydraulic brake applying mechanism (not shown) such as a brake pedal for feeding hydraulic fluid under pressure into the cylinder 116 below the plunger 130 to drive the latter upwardly in the cylinder 116. Between the valve piston 114 and plunger 130 is a compression spring 140 which transmits the upward force on the plunger to the piston. The piston and plunger are urged downward in the cylinder by a compression spring 142 at the upper end of the piston.

Considering the operation of the hydraulic drive system to this point, the pump 12, when driven by engine 18, delivers hydraulic fluid under pressure to the idling valve ports 72, 102 and cylinder 64. The hydraulic fluid pressure acting on the upper face of the idling valve piston 66 and under face of the idling valve piston 67 produces a downward closing force on the idling valve spool 58 which urges the spool to its lower closed position against the upward opening force of the valve spring 68. This opening spring force is selected to retain the idling valve spool 58 in its upper open position when the pump 12 is operating at a selected idling speed. In this open or idling position of the idling valve, hydraulic fluid flows directly from the pump outlet 16 to the pump inlet 14 through the open idling passage 104 and no fluid is delivered to the motor 20. Accordingly, the pump idles without driving the motor. As the pump operating speed increases from idling speed to full or high speed, the pump outlet pressure increases, thereby increasing the closing force on the idling valve spool 58. The valve spool is gradually moved to closed position by this increasing closing force to progressively restrict and finally entirely block fluid flow through the idling passage 104. Fluid under progressively increasing pressure then flows from the idling valve 30, through passage 74, to the shift control valve port 78.

It is significant to note here that the lower end of the idling valve spool 58 has a piston 144 with small axial ports 146. The lower end of the valve bore 62 in which the piston 144 moves communicates to flow passage 92 through a small passage 148 and the passage 124 and is thus filled with hydraulic fluid. Movement of piston 144 through this fluid provides a viscous damping or dashpot action which retards opening and closing movement of the idling valve to effect smooth acceleration and deceleration of the motor, as explained presently. It will be understood that in the various drive system operating modes, the idling valve closes and opens in the manner explained above in response to changing pump outlet pressure. The idling valve serves certain additional functions as will be explained later. The operation of the hydraulic braking valve in the various operating modes will also be explained later.

Assuming that the shift control valve spool 42 is in its neutral position, the spool land 106 uncovers the valve ports 78, 82 to permit hydraulic fluid flow to the motor passage 80. The spool land 108 blocks the valve port 88. Spool land 125 uncovers ports 120, 122. Under these conditions, hydraulic fluid flows from the valve port 78, through the control valve to the passage 80, then through the by-pass passage 84 and back through the control valve to the passage 92 and thence back to the pump 12. Accordingly, the motor 20 remains inoperative. It is significant to note here that closing of the braking valve 32 by hydraulic pressure through the conduit 138 with the control valve 28 in neutral hydraulically locks the motor 20.

Assume next that the shift control valve spool 42 is moved upwardly to low position. The spool land 106 then continues to uncover valve ports 78, 82, land 108 uncovers port 88 and communicates the latter to passage 92, land 110 partially covers ports 94, 86 and land 125 continues to uncover ports 120, 122. Under these conditions, hydraulic fluid flows through the control valve from passage 74 through passage 80 to the motor 20 as well as through by-pass passage 84 back through the control valve to passage 92 and thence back to the pump. Exhaust fluid from the motor flows through passages 90 and 118, through the control valve and passage 92 to the pump. The motor 20 is thereby driven in the counterclockwise or forward direction. In this operating mode, therefore, only a portion of the hydraulic fluid delivered by the pump 12 flows through the motor 20 so that the engine speed required to produce any given pump speed, and hence the hydraulic fluid pressure to the motor, are greater than with the by-pass passage 84 closed, as it is in the forward drive position explained below. Accordingly, in the low drive position of the control valve 28, motor 20 is driven at reduced speed with increased torque at any given pump and engine speed compared to motor speed and torque at the same pump and engine speed in drive position.

In the forward drive position of the shift control valve spool 42, the spool lands 106, 108 continue to uncover the valve ports 78, 82, while the ports 86, 94 are blocked by the spool land 110. Land 125 continues to uncover ports 120, 122. Operation of the drive system in this forward drive mode is thus essentially the same as in low except that all of the hydraulic fluid delivered by the pump 12 flows through the motor 20 and returns to the pump through the brake passage 118 to drive the latter in the forward direction at increased speed and with reduced torque compared to the motor speed and torque at any given pump and engine speed in low.

Continued upward movement of the control valve spool 42 to park position locates the spool lands 108, 110, 125 in positions where they block the valve ports 78, 86, 94, 120 and 122. Under these conditions the motor 20 is hydraulically locked against rotation.

The final position of the shift control valve spool 42 is reverse. In this position, the spool lands 106, 108 blocks valve port 82 and communicate valve ports 78, 88. Land 108 uncovers ports 86, 94, and land 110 blocks ports 120, 122. Under these conditions hydraulic fluid flow occurs from passage 74, through the control valve, passage 90 and motor 20 to passage 80 to drive the motor in the clockwise or reverse direction. Exhaust fluid from the motor returns to the pump 12 through passage 80, by-pass 84, control valve 28, and passage 92.

It will now be understood that in any drive mode of the drive system 10, i.e., any drive position of the shift control valve spool 42, the idling valve 30 remains open and the motor 20 remains stationary when the pump 12 and its drive engine 18 are operating at idling speed. The idling valve closes at a controlled rate as the pump and engine speed are increased to effect driving of the motor at progressively increasing speed in the forward or reverse direction, as the case may be. In neutral, the motor 20 remains stationary but free to rotate, while in park position, the motor is hydraulically locked against rotation.

Turning to the hydraulic braking valve 32, it will be recalled that in both neutral and forward drive, the motor port 24, which is then the exhaust port, communicates to the pump inlet 14 only through the braking passage 118. Accordingly, a hydraulic braking action may be produced on the motor by depressing the brake pedal or other means to supply hydraulic braking pressure to the piston valve 114 for urging the latter upwardly to closed position and thereby restricting hydraulic fluid return flow from the motor to the pump. The brake valve opening spring 142 is selected to have a rate which provides, in conjunction with the pressure applied to the brake pedal, desired braking action between the extremes of smooth gradual deceleration to maximum braking action.

The pressure relief valve 36 provides both overpressure protection for the motor 20 and an anti-skid action. To this end, the valve has a piston valve 150 biased by a spring 152 to closed position wherein the valve engages a valve seat 153 to block flow through a by-pass passage 154 communicating the passages 90, 124 through the control valve 28 in hydraulic parallel relation to the braking passage 118. The valve spring 152 is selected to have a rate such that fluid pressure in the passage 90, which is the fluid return passage of the motor 20 in low and drive positions, opens the relief valve before the back pressure on the motor becomes great enough to hydraulically lock the motor and hence lock up the vehicle drive wheels and perhaps damage the motor. It is significant to note that the relief valve ports 156, 158 in the control valve 28 are always open so that the relief valve provides over-pressure protection at all times. For example, if the control valve spool 42 is inadvertently moved to park position while the vehicle is traveling at high speed, the valve will open to prevent wheel lock up and thereby skidding as well as damage to the drive system.

The pressure relief valve 34 is provided to prevent overpressure damage to the drive system as well as spinning of the drive wheels when the pump 12 and its drive engine 18 are accelerated to full power from a dead stop or upon inadvertent acceleration of the pump and engine in park position. To this end, the valve has a piston valve 160 which is urged by a spring 162 to closed position of engagement with a valve seat 164 to block flow through a by-pass passage 166 communicating the pump outlet and return passages 70, 100 in hydraulic parallel relation with the idling passage 104. Spring 162 is selected to have a rate such that the valve opens to by-pass hydraulic fluid from the pump outlet to its inlet before spinning of the drive wheels occurs. If desired, the rate of the valve spring 162 may be increased to permit a dragster to "burn rubber".

The idling valve 30 serves an important function in addition to the idling function explained earlier. Thus, when the vehicle is coasting with the engine idling, the idling valve spring 68 forces the valve open to provide make-up fluid flow through the motor 20 for preventing cavitation. The open valve also provides an idling circuit for the hydraulic pump 12.

The modified hydraulic drive system 10a of FIG. 2 has a modified hydraulic braking action which is designed to aid and thereby reduce wear of the standard hydraulic braking system of a vehicle rather than replace the standard brake system as is the braking system in the drive system of FIG. 1. This modified drive system is essentially identical to that of FIG. 1 except for its modified hydraulic braking valve arrangement and the omission of the relief valve 34. Accordingly, it is unnecessary to describe the modified system in elaborate detail. Suffice it to say that the drive system 10a has an engine driven hydraulic pump 12a, idling valve 30a, shift control valve 28a, hydraulic motor 20a, hydraulic braking valve 32a, heat exchanger 101a, hydraulic fluid reservoir 101b, and passage means 38a connecting the listed components in essentially the same manner as in the earlier drive system. A major difference in the hydraulic drive system 10a resides in the modified construction and arrangement of the control valve 28a and hydraulic braking valve 32 a whereby a hydraulic braking action is accomplished manually by operation of the control valve rather than by depression of a brake pedal, as in FIG. 1.

To this end, the shift control valve 28a has a valve spool 42a which is movable to drive, reverse, and neutral hydraulic braking positions. In the drive and reverse positions of the valve spool 42a, the operation of the modified hydraulic drive system is essentially identical to that of FIG. 1. Accordingly, it is unnecessary to repeat the system operation in detail. Suffice it to say that in drive position, acceleration of the pump engine 18a from idling closes the idling valve 30a. Hydraulic fluid then flows through the motor 20a in a direction to drive the motor in its forward or counterclockwise direction. In the reverse position of the control valve, fluid flows in the opposite direction through the motor to drive the latter in the reverse or clockwise direction.

Referring now to the hydraulic braking action, the braking valve 32a comprises a valve member 114a removable in a bore 116a in the valve block 40a to control hydraulic fluid flow through a passage 118a from the motor passage 90a, through which hydraulic fluid returns from the motor 20a to the control valve 28a in the forward direction of motor rotation. Passage 118a communicates with a port 120a of the control valve. Braking valve member 114a is urged to closed position of engagement with a valve seat 126a, to block flow through passage 118a, by a spring 140a. Extending axially through the valve member 114a is a passage 115a which opens upwardly to passage 90a and downwardly to a passage 154a communicating the lower end of the valve bore 116a with the passage 118a downstream of the braking valve.

Within the valve passage 115a is a check valve 36a including a valve member 150a which is engageable with an upwardly facing valve seat 153a about the passage. A spring 152a urges the check valve member 150a against the valve seat 153a to close the valve passage 115a, as does hydraulic fluid pressure above the braking valve in the motor passage 90a.

The valve spool 42a of control valve 28a has three positions, namely, an upper forward drive position, a lower reverse position, and an intermediate neutral-hydraulic braking position. Operation of the drive system 10a in the forward drive and reverse positions of the control valve is essentially identical to that of the first described drive system and hence need not be explained in detail. Suffice it to say that in forward drive and reverse positions, hydraulic fluid flow occurs from the pump 12a through the idling valve 30a and control valve 28a to the motor 20a and from the motor through the valves back to the pump to drive the motor in the forward or reverse directions, depending upon the control valve setting. In these forward and reverse operations of the drive system, the braking valve 32a is retained closed by its spring 140a.

Movement of the valve spool 42a to neutral-hydraulic braking position locates the spool land 108a in position to block the forward return passage 90a of the motor 20a. The braking valve port 120a is then uncovered and communicates through the control valve to the hydraulic fluid return passage 92a which communicates to the intake of the pump 12a through the idling valve 30a and passage 100a. Under these conditions all hydraulic fluid return flow from the motor to the pump occurs through the braking valve passage 118a and past the braking valve 32a. This valve tends to resist the return flow and thereby produce a hydraulic braking action or force on the motor proportional to the rate of the valve spring 140a. The rate of this spring is selected to provide a desired braking force less than that which would cause wheel skidding. The inner check valve 36a in the braking valve member 114a serves as a vacuum relief valve which opens to permit reverse flow of hydraulic fluid from the passage 118a, downstream of the braking valve, through the latter valve into the motor passage 90a in the event of reverse rotation of the motor with the control valve spool 42a in neutral.

The modified hydraulic drive system 10b of FIG. 3 is identical to that of FIG. 1 except for the omission of the hydraulic braking system of the latter figure and the addition, in FIG. 3, of a by-pass return passage 91b leading from the forward hydraulic fluid return passage 90b for the motor 20b to the control valve 28b. When the control valve spool 42b is in neutral, the main return passage 90b is blocked and the by-pass passage 91b is open. This passage is sized to permit restricted hydraulic return flow from the motor to the pump 12b in the event the valve spool is placed in neutral with the vehicle traveling forward at a substantial velocity, thus to prevent damage to the motor and a sudden braking action. This latter modified hydraulic drive system relies totally on the standard hydraulic brake system of the vehicle for braking.

What is claimed as new in support of Letters Patent is:

1. A hydraulic drive comprising:
a hydraulic pump having inlet and outlet ports,
a rotary hydraulic motor having inlet and outlet ports,
a hydraulic system for conducting hydraulic fluid between said pump and motor ports to effect driving of said motor by said pump including a passage communicating said motor outlet port to said pump inlet port,
a manual brake valve for restricting return hydraulic fluid flow through said passage to produce a hydraulic braking action on said motor,
a pressure relief valve passage communicating said motor outlet port and pump inlet port in hydraulic parallel relation with said brake valve, and a normally closed pressure relief valve in said relief passage which opens in response to a predetermined motor outlet pressure to prevent hydraulic lock-up of said motor.

2. A hydraulic drive according to claim 1 wherein:
said brake valve includes a valve member which is movable to open and close said passage, and manual hydraulic valve operating means for effecting movement of said valve member between open and closed positions.

3. A hydraulic drive according to claim 2 wherein:
said hydraulic system comprises a shift control valve for reversing the direction of fluid flow through said motor to reverse the direction of motor rotation, and
said shift valve comprises said brake valve.

4. A hydraulic drive comprising:
a hydraulic pump having inlet and outlet ports,
a rotary hydraulic motor having inlet and outlet ports,
a hydraulic system for conducting hydraulic fluid between said pump and motor ports to effect driving of said motor by said pump including two passages communicating said motor outlet port and pump inlet port in hydraulic parallel relation to one another through which hydraulic fluid returns from said motor to said pump, and
a manual brake in one passage including a first valve member which is movable to open and close said one passage and manual operating means for moving said valve member between open and closed positions, and a relief valve in the other passage including a second valve member which is movable to open and close said other passage, and spring means for biasing said second valve member to closed position against the fluid pressure in said other passage.

5. A hydraulic drive comprising:
a powered hydraulic pump having inlet and outlet ports,
a rotary hydraulic motor having first and second ports through which hydraulic fluid is adapted to enter and exit from said motor to drive the motor, means for conducting hydraulic fluid between said pump and motor ports to effect driving of said motor in either direction by said pump and hydraulic braking of said motor comprising a shift control valve including a valve member movable to a drive position wherein said pump and motor ports communicate for rotation of said motor in one direction by said pump, a reverse position wherein said pump and motor ports communicate for rotation of said motor in the opposite direction by said pump, and a braking position wherein one motor port communicates with said pump outlet port and the other motor port is blocked, a by-pass passage communicating said other motor port to said pump inlet port, a hydraulic braking valve in said by-pass passage including a valve member movable to open and close the latter passage, and means for effecting opening and closing movement of said braking valve member, and a pressure valve relief passage communicating said other motor port and pump inlet port in hydraulic parallel relation with said by-pass passage, and a normally closed pressure relief valve in said relief valve passage which opens in response to a predetermined motor outlet pressure to prevent hydraulic lock-up of said motor.

6. A hydraulic drive according to claim 5 wherein:
said valve member is movable to a park position wherein both said motor ports are blocked to hydraulically lock said motor.

7. A hydraulic drive according to claim 1, including:
an idling passage communicating said pump ports in hydraulic parallel with said motor,
an idling valve in said idling passage including a valve member which is biased to closed position to block fluid flow through said idling passage by the pump outlet pressure, and spring means for biasing said valve member to open position wherein said valve member permits fluid flow through said idling passage in a manner such that said valve remains open to permit fluid flow through said passage and thereby operation of said pump without driving of said motor while said pump is driven at said idling speed, and said valve closes to progressively restrict flow through said idling passage and thereby effect driving of said motor at an increasing speed in response to increasing pump outlet pressure resulting from increasing operating speed of said pump,
a pressure relief valve passage communicating said pump ports in hydraulic parallel relation with said idling passage, and
a normally closed pressure relief valve in said relief passage which opens in response to a predetermined pump outlet pressure greater than that required to fully close said idling valve.

8. A hydraulic drive according to claim 4 including:
an idling passage communicating said pump ports in hydraulic parallel with said motor,
an idling valve in said idling passage including a valve member which is biased to closed position to block fluid flow through said idling passage by the pump outlet pressure, and spring means for biasing said valve member to open position wherein said valve member permits fluid flow through said idling passage in a manner such that said valve remains open to permit fluid flow through said passage and thereby operation of said pump without driving of said motor while said pump is driven at said idling speed, and said valve closes to progressively restrict flow through said idling passage and thereby effect driving of said motor at an increasing speed in response to increasing pump outlet pressure resulting from increasing operating speed of said pump, a pressure relief valve passage communicating said pump ports in hydraulic parallel relation with said idling passage, and a normally closed pressure relief valve in said relief passage which opens in response to a predetermined pump outlet pressure greater than that required to fully close said idling valve.

9. A hydraulic drive comprising:
a powered hydraulic pump having inlet and outlet ports,
a rotary hydraulic motor having first and second ports through which hydraulic fluid is adapted to enter and exit from said motor to drive the motor,
means for conducting hydraulic fluid between said pump and motor ports to effect driving of said motor in either direction by said pump and hydraulic braking of said motor comprising a shift control valve including a valve member movable to a drive position wherein said pump and motor ports communicate for rotation of said motor in one direction by said pump, a reverse position wherein said pump and motor ports communicate for rotation of said motor in the opposite direction by said pump, and a braking position wherein one motor port communicates with said pump outlet port and the other motor port is blocked, a by-pass passage communicating said other motor port to said pump inlet port, a hydraulic braking valve in said by-pass passage including a valve member movable to open and close the latter passage, and means for effecting opening and closing movement of said braking valve member, an idling passage communicating said pump ports in hydraulic parallel with said motor, an idling valve in said idling passage including a valve member which is biased to closed position to block fluid flow through said idling passage by the pump outlet pressure, and spring means for biasing said valve member to open position wherein said valve member permits fluid flow through said idling passage in a manner such that said valve remains open to permit fluid flow through said passage and thereby operation of said pump without driving of said motor while said pump is driven at said idling speed, and said valve closes to progressively restrict flow through said idling passage and thereby effect driving of said motor at an increasing speed in response to increasing pump outlet pressure resulting from increasing operating speed of said pump, a pressure relief valve passage communicating said pump ports in hydraulic parallel relation with said idling passage, and a normally closed pressure relief valve in said relief passage which opens in response to a predetermined pump outlet pressure greater than that required to fully close said idling valve.

10. A hydraulic drive according to claim 9 wherein:
said valve member is movable to a park position wherein both said motor ports are blocked to hydraulically lock said motor.

* * * * *